US011694028B2

(12) United States Patent
Fujimura et al.

(10) Patent No.: US 11,694,028 B2
(45) Date of Patent: Jul. 4, 2023

(54) DATA GENERATION APPARATUS AND DATA GENERATION METHOD THAT GENERATE RECOGNITION TEXT FROM SPEECH DATA

(71) Applicant: KABUSHIKI KAISHA TOSHIBA, Minato-ku (JP)

(72) Inventors: Hiroshi Fujimura, Yokohama (JP); Kenji Iwata, Machida (JP); Hui Di, Beijing (CN); Pengfei Chen, Beijing (CN)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 17/007,522

(22) Filed: Aug. 31, 2020

(65) Prior Publication Data

US 2021/0264895 A1   Aug. 26, 2021

(30) Foreign Application Priority Data

Feb. 21, 2020 (JP) .................................. 2020-027986

(51) Int. Cl.
*G06F 40/30* (2020.01)
*G06F 40/279* (2020.01)
*G10L 13/02* (2013.01)
*G10L 13/08* (2013.01)
(Continued)

(52) U.S. Cl.
CPC ............ *G06F 40/279* (2020.01); *G06F 18/22* (2023.01); *G10L 13/02* (2013.01); *G10L 13/08* (2013.01); *G10L 15/187* (2013.01)

(58) Field of Classification Search
None
See application file for complete search history.

(56) References Cited

U.S. PATENT DOCUMENTS

| 8,768,704 | B1 * | 7/2014 | Fructuoso | ............. | G06F 40/284 |
| | | | | | 704/277 |
| 9,002,703 | B1 * | 4/2015 | Crosley | ................... | G10L 15/26 |
| | | | | | 704/207 |
| 9,245,278 | B2 * | 1/2016 | Orsini | ................... | G06F 40/242 |

(Continued)

FOREIGN PATENT DOCUMENTS

JP   2003-108180 A   4/2003

OTHER PUBLICATIONS

Ueno, S. et al., "Multi-Speaker Sequence-to-Sequence Speech Synthesis for Data Augmentation in Acoustic-to-Word Speech Recognition", ICASSP 2019, May 12-17, 2019, 5 pages.

*Primary Examiner* — Jakieda R Jackson
(74) *Attorney, Agent, or Firm* — Oblon, McClelland, Maier & Neustadt, L.L.P.

(57) ABSTRACT

According to one embodiment, the data generation apparatus includes a speech synthesis unit, a speech recognition unit, a matching processing unit, and a dataset generation unit. The speech synthesis unit generates speech data from an original text. The speech recognition unit generates a recognition text by speech recognition from the speech data. The matching processing unit performs matching between the original text and the recognition text. The dataset generation unit generates a dataset in such a manner where the speech data, from which the recognition text satisfying a certain condition for a matching degree relative to the original text is generated, is associated with the original text, based on a matching result.

10 Claims, 5 Drawing Sheets

(51) Int. Cl.
   *G10L 15/187*   (2013.01)
   *G06F 18/22*   (2023.01)

(56) References Cited

U.S. PATENT DOCUMENTS

2010/0169093 A1* 7/2010 Washio ................. G10L 15/063
                                                        704/243
2016/0027431 A1* 1/2016 Kurzweil ............... G09B 5/062
                                                        715/203
2018/0314689 A1* 11/2018 Wang ...................... G10L 15/07

* cited by examiner

| Original text | eスポーツを見たい(i-spo-tsu wo mitai) |
|---|---|
| Speech synthesis 1 | エスポーツヲミタイ(esupo-tsu wo mitai) |
| Speech recognition 1 | Sポーツを見たい(esu-po-tsu wo mitai) |
| Original text ≠ Speech recognition 1 ||

F I G. 4A

| Original text | eスポーツを見たい(i-spo-tsu wo mitai) |
|---|---|
| Speech synthesis 2 | イースポーツヲミタイ(i-spo-tsu wo mitai) |
| Speech recognition 2 | eスポーツを見たい(i-spo-tsu wo mitai) |
| Original text = Speech recognition 2 ||

F I G. 4B

| Original text | こんにちは(kon-nichi-wa) |
|---|---|
| Speech synthesis 1 | コンニチワ(kon-nichi-wa) |
| Speech recognition 1 | こんにちは(kon-nichi-wa) |
| Original text = Speech recognition 1 | |

FIG. 5

| Original text | 九十九の町を見てみたい(tsukumo no machi wo mite mitai) |
|---|---|
| Speech synthesis 1 | キュージューキューノマチヲミテミタイ(kyu-ju-kyu no machi wo mite mitai) |
| Speech recognition 1 | 99の町を見てみたい(kyu-ju-kyu no machi wo mite mitai) |
| Original text ≠ Speech recognition 1 | |

FIG. 6A

| Original text | 九十九の町を見てみたい(tsukumo no machi wo mite mitai) |
|---|---|
| Speech synthesis 2 | ツクモノマチヲミテミタイ(tsukumo no machi wo mite mitai) |
| Speech recognition 2 | 九十九の町を見てみたい(tsukumo no machi wo mite mitai) |
| Original text = Speech recognition 2 | |

FIG. 6B

| Original text | ジタハラって何ですか(jitahara-tte-nan-desuka) |
|---|---|
| Speech synthesis 1 | ジタハラッテナンデスカ(jitahara-tte-nan-desuka) |
| Speech recognition 1 | 自田原って何ですか(jitahara-tte-nan-desuka) |
| Original text ≠ Speech recognition 1 ||

FIG. 7

| Original text | 调 (tiao) 低湿度(di shi du) |
|---|---|
| Speech synthesis 1 | 调 (diao) 低湿度(di shi du) |
| Speech recognition 1 | 掉 (diao) 低湿度(di shi du) |
| Original text ≠ Speech recognition 1 ||

FIG. 8

DATA GENERATION APPARATUS AND DATA GENERATION METHOD THAT GENERATE RECOGNITION TEXT FROM SPEECH DATA

CROSS REFERENCE TO RELATED APPLICATIONS

This application is based upon and claims the benefit of priority from Japanese Patent Application No. 2020-027986, filed Feb. 21, 2020, the entire contents of which are incorporated herein by reference.

FIELD

Embodiments described herein relate generally to a data generation apparatus and a data generation method.

BACKGROUND

A speech recognition technology to convert a speech (spoken voice) into a text is known. In such a speech recognition technology, it is possible to cause an apparatus to learn, for example, a series of processing operations from speech inputting to text outputting, as an End-to-End model and thereby improve performance. Generally, model learning presents a simultaneous requirement for both a huge volume of voice utterance data and matching transcripts (transcription texts). As learning data used for learning a model, simulation data imitative of a voice utterance can conceivably be generated by performing a speech synthesis from a text provided with pronunciation information.

However, in the case of a text not provided with pronunciation information, the synthetic speech becomes inaccurate due to pronunciation inaccuracies. Simulation data which includes a pair of an inaccurate synthetic speech and a text is unable to cause an apparatus to learn a model appropriately.

BRIEF DESCRIPTION OF THE DRAWINGS

FIG. 4A is a diagram showing a first example of a matching result obtained by the data generation apparatus according to one embodiment;

FIG. 4B is a diagram showing an example of a matching result when a different pronunciation is used for the original text of FIG. 4A;

FIG. 5 is a diagram showing a second example of a matching result obtained by the data generation apparatus according to one embodiment;

FIG. 6A is a diagram showing a third example of a matching result obtained by the data generation apparatus according to one embodiment;

FIG. 6B is a diagram showing an example of a matching result when a different pronunciation was used for the original text of FIG. 6A;

FIG. 7 is a diagram showing a fourth example of a matching result obtained by the data generation apparatus according to one embodiment; and FIG. 8 is a diagram showing a fifth example of a matching result obtained by the data generation apparatus according to one embodiment.

DETAILED DESCRIPTION

According to one embodiment, the data generation apparatus includes a speech synthesis unit, a speech recognition unit, a matching processing unit, and a dataset generation unit. The speech synthesis unit generates speech data from an original text. The speech recognition unit generates a recognition text by speech recognition from the speech data generated by the speech synthesis unit. The matching processing unit performs matching between the original text and the recognition text generated by the speech recognition unit. The dataset generation unit generates a dataset in such a manner where the speech data, from which the recognition text satisfying a certain condition for a matching degree relative to the original text is generated, is associated with the original text, based on a matching result.

Hereinafter, various embodiments will be described with reference to the accompanying drawings.

In the description below, the same elements as, or similar elements to, those described will be denoted by the same reference or similar symbols, and overlapping descriptions are basically omitted. For example, where there exist a plurality of the same or similar elements, a common reference symbol may be used for describing the respective elements without their being discriminated from each other, or branch numbers may be used in addition to said common reference symbol to describe the respective elements in a discriminated manner.

One Embodiment (Configuration)

Figure 1:
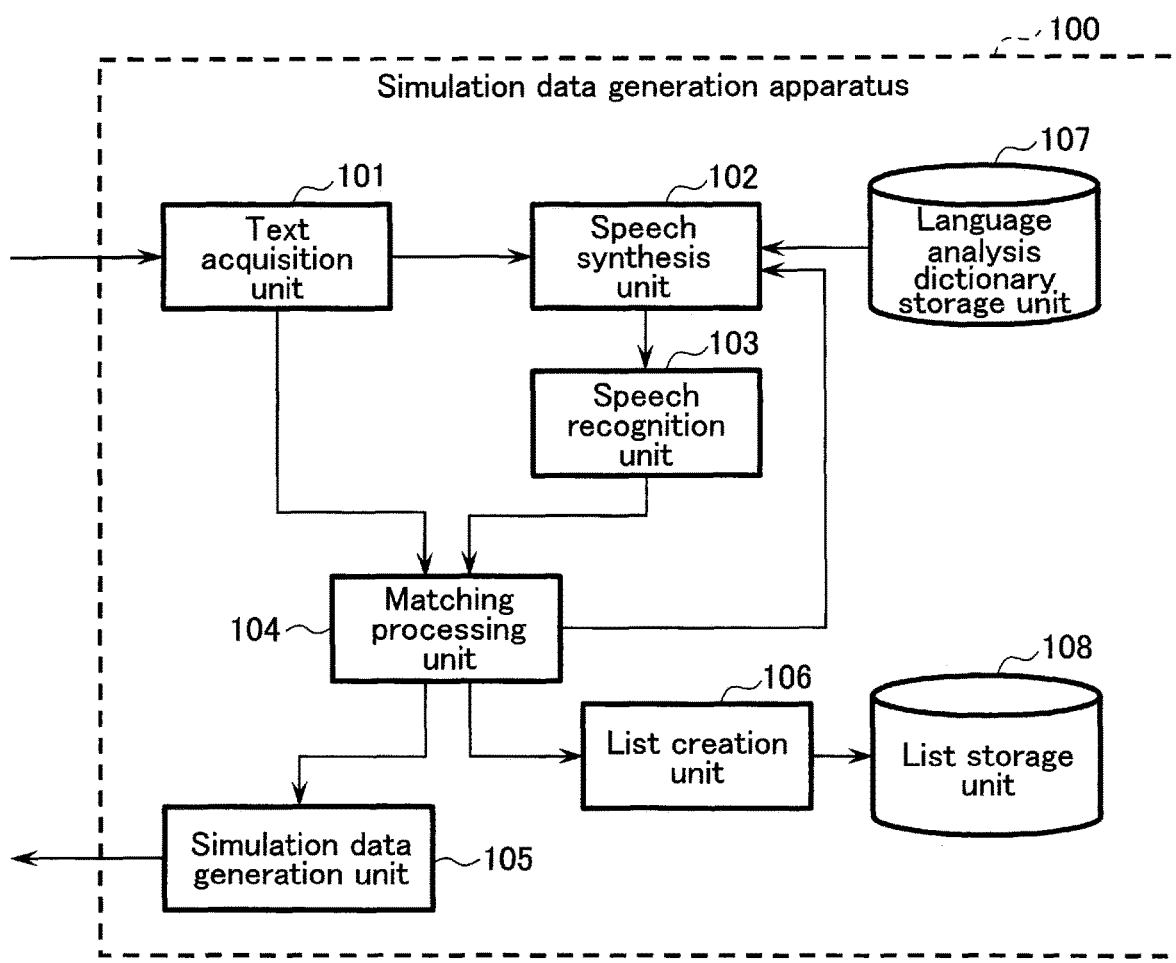
FIG. 1 is a block diagram exemplarily showing a functional configuration of a data generation apparatus according to one embodiment.

FIG. 1 is a block diagram schematically showing the configuration of a simulation data generation apparatus 100 as the data generation apparatus according to one embodiment.

The simulation data generation apparatus 100 is, for example, a computer, such as a server computer or a personal computer, and generates utterance simulation data containing a pair of a speech and a text. The simulation data generation apparatus 100 includes, as processing function units, a text acquisition unit 101, a speech synthesis unit 102, a speech recognition unit 103, a matching processing unit 104, a simulation data generation unit 105, and a list creation unit 106. The simulation data generation apparatus 100 may further include a language analysis dictionary storage unit 107 and a list storage unit 108.

The text acquisition unit 101 receives input of an original text, and performs the processing for handing over the original text to the speech synthesis unit 102 and the matching processing unit 104.

The speech synthesis unit 102 analyzes the original text, estimates reading (a pronunciation), an accent, intonation, etc. from the original text, and generates speech data through a speech synthesis. The speech synthesis unit 102 may use a language analysis dictionary stored in the language analysis dictionary storage unit 107 to estimate a pronunciation and an accent for the original text. The language analysis dictionary defines a pronunciation and an accent that may be assigned to, for example, a character, a word, a clause, or a sentence. The speech synthesis unit 102 estimates a pronunciation and an accent based on the correspondence between the character, word, clause or sentence defined in the language analysis dictionary and the character, word, clause or sentence contained in the original text. If there exist a plurality of possible combinations in the correspondence between the language analysis dictionary and the original text, including where the original text should be sectioned, the speech synthesis unit 102 can use these combinations for the speech synthesis, as the other candidates, as will be described later. Also, as will be described later, upon receipt of a matching result from the matching processing unit 104, the speech synthesis unit 102 may also assign a different pronunciation or a different accent to at least a part of the original text, and generate different speech data. The speech synthesis unit 102 hands over the generated speech data to the speech recognition unit 103.

The speech recognition unit 103 receives the speech data generated by the speech synthesis unit 102, generates a text from said speech data by speech recognition, and outputs it as a recognition result (also referred to as a "recognition text") to the matching processing unit 104.

The matching processing unit 104 receives the original text from the text acquisition unit 101, receives the recognition result from the speech recognition unit 103, performs matching between the original text and the recognition result, extracts a different portion (also referred to as "difference"), and outputs the different portion to the simulation data generation unit 105. Also, the matching processing unit 104 may also output the different portion to the speech synthesis unit 102. The speech synthesis unit 102 that has received the different portion assigns a different pronunciation or a different accent to the character, word, clause or sentence of the original text containing said different portion, as described above, to regenerate speech data from the original text. The matching processing unit 104 may also output the matching result to the list creation unit 106.

The simulation data generation unit 105 as a dataset generation unit calculates a matching degree based on the different portion received from the matching processing unit 104, and generates utterance simulation data as a dataset, in which the speech data generated by the speech synthesis unit 102 is associated with the original text, based on the matching degree. In one embodiment, the simulation data generation unit 105 calculates a degree of matching (also referred to as a "matching degree") of the simulation data to the original text, based on the different portion between the original text and the recognition result. The simulation data generation unit 105 then generates a dataset using the speech data that has brought about a recognition result where a matching degree to the original text satisfies a certain condition. The degree of matching is calculated, for example, as character correct answer accuracy. The character correct answer accuracy refers to a match accuracy of characters between the recognition result and the original text (correct answer text). The degree of matching may be calculated as word correct answer accuracy. Alternatively, the degree of matching may be calculated as the number of characters or words matching the original text.

In the case where a plurality of speech data pieces are generated based on a plurality of candidates for a pronunciation or an accent, and one or more recognition results are generated from the plurality of speech data pieces, the simulation data generation unit 105 can generate a dataset using only speech data that has brought about a recognition result having the highest degree of matching. If there are one or more recognition results having the same degree of matching, the simulation data generation unit 105 may randomly select any one of the recognition results. Alternatively, the simulation data generation unit 105 may employ all speech data pieces that have brought about recognition results in which the matching degree is equal to or greater than a predetermined threshold to generate a dataset where the speech data pieces are each associated with the original text.

The list storage unit 106 receives the matching result from the matching processing unit 104 and creates a list for recording a history of the processing.

The language analysis dictionary storage unit 107 stores a preliminarily defined language analysis dictionary, which may be used for speech syntheses by the speech synthesis unit 102.

The list storage unit 108 stores the list created by the list creation unit 106.

Figure 2:
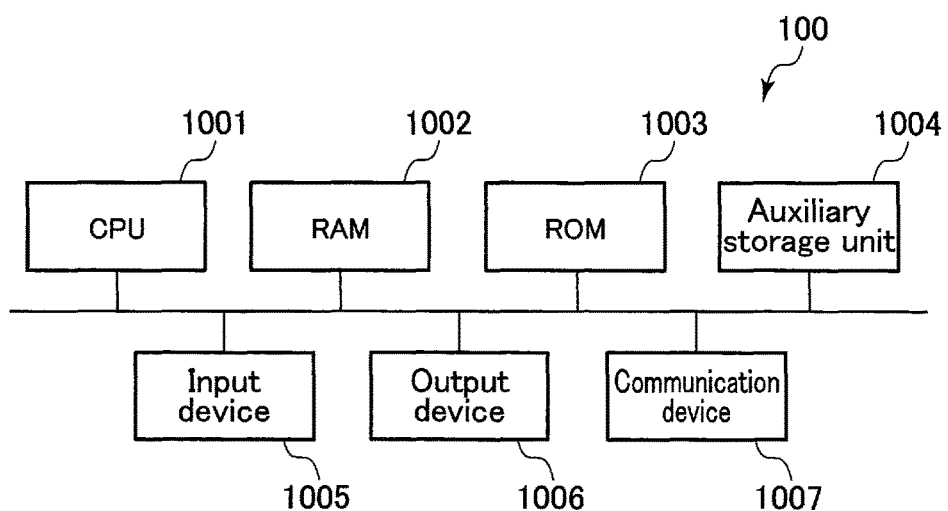
FIG. 2 is a block diagram exemplarily showing a hardware configuration of the data generation apparatus according to one embodiment.

FIG. 2 schematically shows an example of the hardware configuration of the simulation data generation apparatus 100 as described above. As shown in FIG. 2, the simulation data generation apparatus 100 includes, central processing unit (CPU) 1001, a random access memory (RAM) 1002, a read only memory (ROM) 1003, an auxiliary storage device 1004, an input device 1005, an output device 1006, and a communication device 1007.

The above-mentioned processing functions of the simulation data generation apparatus 100 are realized by the CPU1001, by developing programs stored in the ROM1003 or auxiliary storage device 1004 on the RAM1002 and executing these programs. The CPU1001 is an example of a hardware processor. The hardware processor is not limited to a general-purpose processor, such as the CPU1001, and may be an exclusive processor, such as an application specific integrated circuit (ASIC) or a field-programmable gate array (FPGA).

The auxiliary storage device 1004 includes a computer-readable storage medium that stores data in an involatile manner, and may be a hard disc drive (HDD) or a solid state drive, for example. The auxiliary storage device 1004 operates as a storage unit including the language analysis dictionary storage unit 107 and the list storage unit 108.

The input device 1005 includes, for example, a keyboard, a mouse, a joystick, a microphone, and the like. The output device 1006 includes, for example, a display device, such as a liquid crystal display, and an organic EL display; a speaker, and the like. The input device 1005 and the output device 1006 may be an integral-type touch panel device in which a display device, such as a liquid crystal panel, and an input device, such as a touch pad, are combined.

The communication device 1007 communicates either wirelessly or via a wired connection with external devices. The communication device 1007 includes, for example, a local area network (LAN) port, is connected to a communication network using a LAN cable, and transmits/receives data with the external devices via the communication network. The communication device 1007 may include a wireless module, for example, a wireless LAN module or Bluetooth (registered trademark) module. The communication device 1007 may also include an external interface, such as a USB port.

As described above, learning a speech recognition model, including an End-to-End model, requires a huge volume of data containing a pair of a speech and a text. With a text provided with pronunciation information, it is possible to generate simulation data imitative of the voice utterance (speech production) through use of a speech synthesis. However, in the case where only a text not provided with pronunciation information exists, there is a risk that the text is misread (that is, the pronunciation of the text is inaccurately estimated) during the speech synthesis, leading to the generation of simulation data containing inaccurate speech data.

For example, when there is a text of "eeスポーツを見たい (i-spo-tsu wo mitai) (meaning "want to see an e-sport" in English; the Japanese text including both kanji and hiragana characters), the user originally wants to learn it with a pronunciation of "イースポーツヲミタイ (i-spo-tsu wo mitai)". However, if the apparatus wrongly estimates the pronunciation, it brings into being simulation data in which a speech such as "エスポーツヲミタイ ((esupo-tsu wo mitai)" is associated with the text. In the case of using such simulation data, the text of "eeスポーツを見たい (i-spo-tsu wo mitai) is inaccurately learned with a pronunciation of "エスポーツヲミタイ (esupo-tsu wo mitai)".

As described above, when automatically estimating a pronunciation from text data and generating a simulation speech of the text data, in the case where a wrong estimation of a pronunciation is made, the risk emerges whereby it is impossible to cause an apparatus to learn the user's desired utterance (speech production) with an accurate pronunciation.

The simulation data generation apparatus 100 according to one embodiment, therefore, generates voice utterance data from given text data through a speech synthesis, performs text matching between an original text and a primary result in which the voice utterance data is recognized through speech recognition, and calculates a matching degree. Where exact matching is obtained, the simulation data generation apparatus 100 employs the speech as simulation data. Where exact matching is not obtained, the simulation data generation apparatus 100 provides another pronunciation candidate to the different portion, synthesizes the speech again, and matches a secondary result, in which the synthesized speech is recognized, with the original text. The simulation data generation apparatus 100 repeats this process by the number of different pronunciation candidates and employs a speech synthesis result having a high matching degree as simulation speech data. With this configuration, highly accurate utterance simulation data using a simulation speech with a more accurate pronunciation is generated.

(Operation)

Next, the operation of the simulation data generation apparatus 100 according to one embodiment configured as described above will be described.

Figure 3:
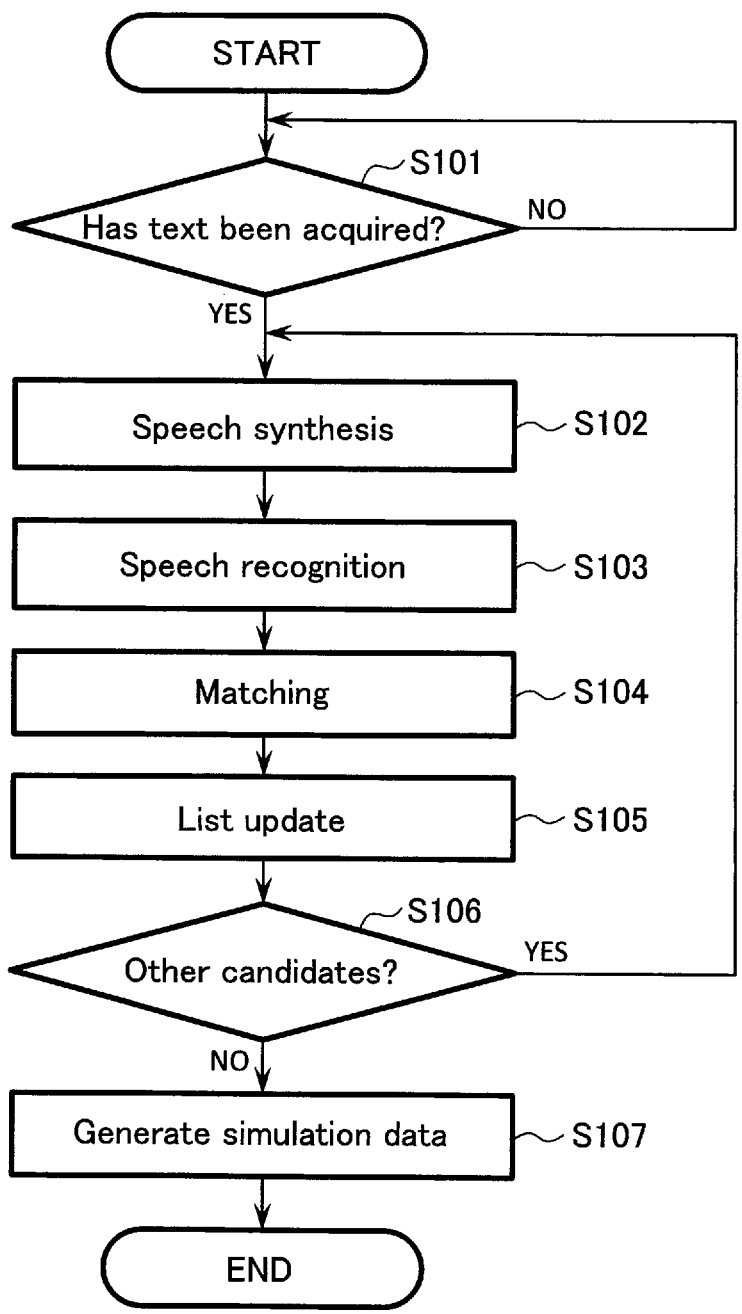
FIG. 3 is a flowchart exemplarily showing a processing operation by the data generation apparatus according to one embodiment.

FIG. 3 is a flowchart schematically showing a first example of the processing operation of the simulation data generation apparatus 100. As shown in FIG. 3, the simulation data generation apparatus 100 first awaits text input in step S101. The text input may be made by any method. For example, a text may be input via the input device 1005 by a user of the simulation data generation apparatus 100, or read as text data from an external storage medium, such as a USB, or a database server, etc. over a network, etc.

Here, one example is described assuming that the simulation data generation apparatus 100 receives input of a text, "eeスポーツを見たい (i-spo-tsu wo mitai)", from the text acquisition device 101. The text to be input is not necessarily a single sentence, and may be a plurality of sentences or a part of a sentence, such as a word. Upon receipt of the input of the text (step S101: YES), the simulation data generation apparatus 100 proceeds to a subsequent step.

In step S102, the simulation data generation apparatus 100 analyzes the text received from the text acquisition unit 101 by means of the speech synthesis unit 102, estimates a pronunciation and an accent of the text, and generates synthetic speech data through a speech synthesis using the pronunciation and the accent as input. A common speech synthesizer may be used for the speech synthesis by the speech synthesis unit 102. For example, the speech synthesis unit 102 can use an End-to-End speech synthesis technique, such as HMM speech synthesis technique and WaveNet, but the synthesis method is not limited thereto.

For the estimation of pronunciations and accents by the speech synthesis unit 102, a language analysis dictionary as described above can be used. The speech synthesis unit 102 estimates a pronunciation, for example, for each character, word, clause, or sentence contained in a text.

Here, by way of example, let us assume that a pronunciation of "エスポーツヲミタイ (esupo-tsu wo mitai)" and the most suitable accent for the pronunciation was obtained for a text, "eeスポーツを見たい (i-spo-tsu wo mitai)", as an estimation result pronounced by the speech synthesis unit 102. As a result, speech data of "エスポーツヲミタイ (esupo-tsu wo mitai)" is generated by the speech synthesis unit 102 and output to the speech recognition unit 103.

Next, in step S103, the simulation data generation apparatus 100 performs speech recognition processing through the speech recognition unit 103, based on the speech data output from the speech synthesis unit 102, and outputs the recognition result. In the above described example, when the speech data of "エスポーツヲミタイ (esupo-tsu wo mitai)" generated and output by the speech synthesis unit 102 is input to the speech recognition unit 103, the speech recognition unit 103 outputs, for example, a recognition result (or recognition text) of "Ssポーツを見たい (esu po-tsu wo mitai)". A common speech recognition equipment may be used for speech recognition by the speech recognition device 103. For example, the speech recognition unit 103 can use a speech recognition method using an acoustic model and a language model, or an End-to-End speech recognition method in which an acoustic model and a language model are provided in an integral manner, but the equipment and the method for the speech recognition are not limited thereto.

In step S104, the simulation data generation apparatus 100 performs matching between the recognition result output from the speech recognition unit 103 and the original text, through the matching processing unit 104, extracts and outputs a different portion (or difference) therebetween. In the above-described example, the matching processing unit 104 matches the original text, "eeスポーツを見たい (i-spo-tsu wo mitai)", with a recognition result by the speech recognition unit 103, "Ssポーツを見たい (esu po-tsutsu wo mitai)", and extracts words containing different portions of "eeスポーツ (i-supo-tsu)" and "Ssポーツ (esu po-tsu)". Common DP matching in word units may be used for the matching through use of the matching processing unit 104. However, the matching method is not limited to the method described above, and an extraction of different portions may be made using another method. The matching processing unit 104 may extract the different portions in, for example, word units, clause units, or sentence units.

FIG. 4A shows an example of such a matching result. As described above, the speech "エスポーツヲミタイ (esupo-tsu wo mitai)", was obtained from the original text, "eeスポーツを見たい (i-spo-tsu wo mitai)", through a speech synthesis 1, and the recognition text, "Ssポーツ

を見たい (esu po-tsutsu wo mitai)", was obtained from said speech through speech recognition 1. The recognition result of the speech recognition 1 does not match with the original text.

In step S105, the simulation data generation apparatus 100 creates a list through the list creation unit 106 and updates the information stored in the list storage unit 108. The list storage unit 106 can record, in a list, the original text, the obtained recognition text, speech data during the generation of simulation data, etc. as a processing history of the generation of the simulation data. By way of example, the list creation unit 106 records information in the form of (an original text, a recognition text, and pronunciation). In the example of FIG. 4A, the different portions may be recorded as (eeスポーツ (i-supo-tsu), Ssポーツ (esu-po-tsu), and エスポーツ (esupo-tsu)). Not only different portions but also full texts may be recorded in the list, and information on matching results and accents may be further recorded in the list.

Step S105 is a discretional step. The list creation unit 106 may record all matching results or only a specific result. For example, the list creation unit 106 may record only cases where 100% matching was obtained, or only cases where 100% matching was not obtained. Furthermore, the list creation unit 106 may maintain records obtained in the past, or overwrite data on the past records. For example, the list creation unit 106 may overwrite a new list on an old list every time the new list is created, and where 100% matching was obtained, other lists associated with the same original text may be deleted.

Next, in step S106, the simulation data generation apparatus 100 determines whether to repeat the processing for different candidates for a pronunciation or accent. According to one embodiment, this determination is made based on a result of matching in step S104. For example, where the character correct answer accuracy is not 100%, i.e., where a different portion between an original text and a recognition result is extracted by the matching processing unit 104, it may be determined that the processing for other candidates should be repeated. In the case where the character correct answer accuracy is not 100%, and with respect to different portions or a portion containing the different portions (e.g., a character, word, clause, or sentence, containing the different portion), there exists a pronunciation or accent which is different from the pronunciation or accent that has been already used for the speech synthesis, it may be determined that the processing should be repeated using the pronunciation or accent. The presence of other candidates for the pronunciation or accent may be verified by searching the language analysis dictionary stored in the language analysis dictionary storage unit 107 by the speech synthesis unit 102. Alternatively, in the case where even though the character correct answer accuracy is 100%, other candidates for a pronunciation or accent of a character exists for a word, a clause, or a sentence contained in the original text, it may be determined that the processing should be repeated. With this configuration, it is possible to generate speech data that does not place limitations on a specific pronunciation for a word for which a plurality of pronunciations are possible (e.g., "close" (k-lou-z/k-lou-s), and "上手" (かみて/うわて/じょうず ("kamite/uwate/jouzu"), etc.), like the case of heteronym.

Where it is determined that the processing should be repeated for other candidates for a pronunciation or an accent (step S101: YES), the processing returns to step S102 and repeats the steps of S102 to S105.

In the example described above, in the first processing, a pronunciation of "エースポーツ (e-spo-tsu)" is given to the "ee ースポーツ (i-supo-tsu)" in the speech synthesis of step S102. In contrast, in the second processing, pronunciation of "イーースポーツ (i--supo-tsu))" is given as another candidate for pronunciation, this pronunciation is input into a voice synthesizer, and speech data is thereby generated. This speech data is then input in a speech recognition apparatus by the speech recognition unit 103 in the speech recognition processing of step S103, and a recognition result of "eeスポーツが見たい (i-supo-tsu ga mitai)" is obtained. In this case, matching between the original text of "eeスポーツが見たい (i-supo-tsu ga mitai)" and the recognition text of "eeスポーツが見たい (i-supo-tsu ga mitai)" is performed in the matching processing of step S104. Since all texts are the same, it is determined that the character correct answer accuracy is 100% (with no different portions).

FIG. 4B shows an example of such a matching result. As described above, for the original text of "eeスポーツを見たい (i-spo-tsu wo mitai)", "イースポーツヲミタイ1 (i-spo-tsu wo mitai)" was obtained through a speech synthesis 2 using another candidate, and "eeスポーツを見たい (i-spo-tsu wo mitai)" was obtained through a speech recognition 2. The recognition result of the speech recognition 2 matches with the original text.

Next, in step S105, the list creation unit 106 performs update processing discretionally. By way of example, the list creation unit 106 creates a list (eeスポーツ (i-supo-tsu), eeスポーツ (i-supo-tsu), and イースポーツ (i-supo-tsu)) as (an original text, a recognition text, and pronunciation). Here, since 100% matching was obtained, the list (eeスポーツ (i-supo-tsu), Ssポーツ (esu-po-tsu), and エスポーツ (esupo-tsu)) created in the first processing may be deleted.

Subsequently, in step S106, whether the processing for other candidates needs to be repeated is determined again. In the example described above, since the character correct answer accuracy of 100% was obtained in the second processing, the processing may be ended, and where there is another or other candidate(s), the processing may be repeated.

In step S106, where it is determined that the processing will not be repeated for the other candidate(s) (step S106: NO), the processing proceeds to step S107.

In step S107, the simulation data generation unit 105 generates utterance simulation data as a dataset, in which the speech data that has brought about a recognition result having a high matching degree is used and associated with the original text. In the above-mentioned example, the speech data generated in the second processing, having high character correct answer accuracy, is employed as utterance simulation data.

FIG. 5 shows another example of a matching result. For an original text, "こんにちは (kon nichi wa)", a speech "コンニチワ (kon nichi wa)" was obtained through the speech synthesis 1, and a recognition text, "こんにちは (kon nichi wa)", was obtained through the speech recognition 1. In this case, the speech recognition result completely matched with the original text in the first processing, and there are no other pronunciation candidates, hence a dataset using a speech "コンニチワ (kon nichi wa)" is generated without repeating the processing with another candidate.

FIG. 6A shows another example of a matching result. For an original text of "九十九の町を見てみたい (tsukumo no machi wo mite mitai)", "キュージューキューノマチヲミテミタイ (kyu-ju-kyu no machi wo mite mitai)" was obtained through a speech synthesis 1, and "99の町を見てみたい (kyu-ju-kyu no machi wo mite mitai)" was obtained through speech recognition 1. In this example, since the original text and the speech recognition 1 do not match, a list related to the different portions (九十九 (kyu-ju-kyu), 99 (kyu-ju-kyu), and キュージューキュー (kyu-ju-kyu)) is added, and the speech synthesis was performed again using the other candidates.

FIG. 6B shows an example of a matching result using such another candidate. For the original text, "九十九の町を見てみたい (tsukumo no machi wo mite mitai)" as described above, "ツクモノマチヲミテミタイ (tsukumo no machi wo mite mitai)" was obtained through a speech synthesis 2, and "九十九の町を見てみたい (tsukumo no machi wo mite mitai)" was obtained through the speech recognition 2. In this case, since the original text and the speech recognition 2 match, the speech at that time, "ツクモノマチヲミテミタイ (tsukumo no machi wo mite mitai)", is employed as a simulation speech. In addition, a list (九十九 (tsukumo), 九十九 (tsukumo), ツクモ (tsukumo)) is created, and the list (九十九, 99, キュージューキュー) created in the speech synthesis 1 is deleted.

FIG. 7 shows an example of a case where an original text and a recognition text do not match. For an original text, "ジタハラって何ですか (jitaharatte-nan-desuka) (What is jitahara? in English), "ジタハラッテ ナンデスカ (jitaharatte-nan-desuka)" was obtained through a speech synthesis 1, and "自田原って何ですか (jitaharatte-nan-desuka)" was obtained through speech recognition 2. In this case, the original text and the recognition text do not match. Therefore, if there are any other candidates for pronunciation, the processing is repeated. If there are no other candidates for pronunciation, the speech synthesis 1 is employed, and the processing is ended. Even in the case where the matching in this way is not 100%, employment of data having a highest matching degree as simulation data among the obtained speech data pieces can sufficiently improve the overall accuracy of the entire data, when viewed as a huge entirety of data. In the case where the matching is not 100%, and there are no other candidates, processing, such as flag setting on the speech data, may be performed.

The simulation data generation apparatus 100 as described above is also applicable to languages other than Japanese. By way of example, characters used in Chinese include other phonetic characters written in the same kanji but read differently.

FIG. 8 shows, as another example of a matching result, an example where the simulation data generation apparatus 100 is applied to an original text including the Chinese "other sound character". A speech recognition 1 obtained for the original text through the first speech synthesis 1 did not match with the original text. In this case, it is expected to obtain a more accurate dataset by performing the speech synthesis using different pronunciation candidates, and employing speech data having a higher matching degree.

Advantageous Effects

As described above in detail, the simulation data generation apparatus 100 according to one embodiment generates voice utterance data through a speech synthesis from a given original text and performs text matching between the original text, and a recognition result in which the voice utterance data is recognized by speech recognition, before calculating a matching degree. Where exact matching is obtained, the simulation data generation apparatus 100 employs the speech as simulation data. Where the recognition result does not match with the original text, a different pronunciation candidate is given to a different portion so that a speech may be synthesized again, and a secondary result, in which the result of the speech synthesis is recognized, is matched with the original text. If there exist other pronunciation candidates, the matching processing may be repeated by the number of the other candidates. The simulation data generation apparatus 100 employs a speech synthesis result having a high matching degree as simulation speech data.

By so using a speech synthesis and a speech recognition in combination, it is possible to reduce the number of speech data pieces having inaccurate pronunciation, and generate utterance simulation data of greater reliability and accuracy containing a pair of a speech and a text, even if an original text is not provided with pronunciation information. With such utterance simulation data, it is possible to learn an End-to-End speech recognition model which requires a huge volume of data more appropriately and efficiently. It should be noted that data generated by the simulation data generation apparatus 100 is not limited to the application to the End-to-End model; the data may be applied to any model, provided that the model uses a pair of a speech and a text.

Also, the simulation data generation apparatus 100 can record a matching result as a list. This can serve to improve the accuracy of data generation.

As described above, according to the embodiment, a technique is provided with the capability of generating utterance simulation data containing a pair of a speech and a text, using a text not provided with pronunciation.

Other Embodiments

It should be noted that the invention is not limited to the above-mentioned embodiments. For example, the simulation data generation apparatus 100 may be configured to perform the processing by distributing respective functional units included in the simulation data generation apparatus 100 to, and arranging them in, a plurality of devices, and causing these devices to perform the processing. Furthermore, the respective functional units may be realized by using circuits. The circuits may be exclusive circuits that realize specific functions, or general-purpose circuits, such as a processor. The language analysis dictionary storage unit 107 and the list storage unit 108 may be provided in an external device.

Furthermore, the flow of processing operations described above is not limited to the procedural steps described above. The sequencing of some steps may be replaced, and some steps may be performed in parallel. In addition, the series of processing operations described above are not necessarily performed temporally in succession, and each step may be performed at a discretional timing.

The speech synthesis, speech recognition, matching processing, etc. are not limited to the specific examples described above. The processing may be replaced by alternative processing that exhibits similar advantageous effects. For example, the speech synthesis unit 102 does not necessarily use a language analysis dictionary, and may be configured to estimate a pronunciation of a character or word by another method.

The techniques described above can also be stored as a program (software means) capable of causing a calculator (computer) to perform the techniques, for example, in a recording medium (storage medium) such as a magnetic disk (floppy (registered trademark) disk, hard disk, etc.), an optical disc (CD-ROM, DVD, MO, etc.), a semiconductor memory (ROM, RAM, flash memory, etc.), or the like, transmitted through a communication medium, and distributed. It should be noted that the program stored on the medium side also encompasses a setup program to cause the calculator to implement software means (including not only an execution program but also tables and data structures) inside the calculator. The calculator that realizes the above-mentioned apparatus reads the program that has been recorded in the recording medium (storage medium) and, depending on the situation, constructs the software means through the setup program; operations are controlled by the software means, so that the calculator performs the above-mentioned processing. It should be noted that the recording medium referred to in this specification is not limited to those for general-purpose, and encompasses storage media, such as a magnetic disk, semiconductor memory, etc. provided in equipments connected inside the calculator or via a network.

In addition to the above, various modifications and changes in the list data format may be made within the scope without departing from the spirit of the inventions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data generation apparatus comprising:
a speech synthesis unit, implemented by circuitry, that generates first speech data from an original text;
a speech recognition unit, implemented by the circuitry, that generates a recognition text from the first speech data by speech recognition, the recognition text being generated using an acoustic model and a language model, the acoustic model and the language model having been previously learned;
a matching processing unit, implemented by the circuitry, that performs matching between the original text and the recognition text; and
a dataset generation unit, implemented by the circuitry, that generates a dataset based on a result of the matching in such a manner that second speech data that has brought about the recognition text where a matching degree to the original text satisfies a certain condition is associated with the original text, the dataset including the second speech data and the original text, the second speech data being included in the first speech data, wherein
if a difference between the recognition text generated from the first speech data and the original text is more than a threshold, the speech synthesis unit generates third speech data assigned at least one of a pronunciation or an accent which is different from that assigned for generating the first speech data.

2. The apparatus according to claim 1, wherein, if, as a result of matching for the first speech data generated from the original text by the matching processing unit, there is a difference between a first recognition text generated from the first speech data and the original text, the speech synthesis unit is configured to assign at least one of a pronunciation or an accent which is different from that assigned at a time of generating the first speech data to at least one of a character, word, clause, or sentence of the original text containing said difference, and generate the third speech data.

3. The apparatus according to claim 2, wherein the dataset generation unit is configured to generate the dataset using the first speech data or the second speech data that has brought about a recognition text having a higher matching degree, out of a second recognition text generated from the second speech data and the first recognition text.

4. The apparatus according to claim 1, further comprising a list creation unit, implemented by the circuitry, that records, when there is a difference between the original text and the recognition text as a result of the matching, a list in which at least one of a character, word, clause, or sentence of the original text containing said difference is associated with information on the first speech data.

5. The apparatus according to claim 4, wherein the list creation unit is configured to record at least one of a pronunciation or an accent assigned to at least one of the character, word, clause, or sentence of the original text containing said difference, as the information on the first speech data.

6. The apparatus according to claim 1, wherein the speech synthesis unit is configured to generate the first speech data using a pronunciation and an accent, corresponding to at least one of possible combinations, based on a correspondence relationship between a character, word, clause, or sentence in a language analysis dictionary, which defines a pronunciation and an accent that may be assigned to a character, word, clause, or sentence, and a character, word, clause, or sentence contained in the original text.

7. The apparatus according to claim 6, wherein the speech synthesis unit is configured to generate the first speech data using a corresponding pronunciation and a corresponding accent defined in the language analysis dictionary for each of the possible combinations.

8. The apparatus according to claim 1, wherein the matching degree is calculated as at least one of character correct answer accuracy, word correct answer accuracy, a number of correct answer characters, or a number of correct answer words, to the original text.

9. A data generation method comprising:
generating first speech data from an original text;
generating a recognition text from the first speech data by speech recognition, the recognition text being generated using an acoustic model and a language model, the acoustic model and the language model having been previously learned;
performing matching between the original text and the recognition text;
generating a dataset based on a result of the matching in such a manner that second speech data that has brought about the recognition text where a matching degree to the original text satisfies a certain condition is associated with the original text, the dataset including the second speech data and the original text, the second speech data being included in the first speech data; and
if a difference between the recognition text generated from the first speech data and the original text is more than a threshold, generating third speech data assigned at least one of a pronunciation or an accent which is different from that assigned for generating the first speech data.

10. A non-transitory computer readable medium including computer executable instructions, wherein the instructions, when executed by a processor, cause the processor to perform a method comprising:

generating first speech data from an original text;

generating a recognition text from the first speech data by speech recognition, the recognition text being generated using an acoustic model and a language model, the acoustic model and the language model having been previously learned, performing matching between the original text and the recognition text;

generating a dataset based on a result of the matching in such a manner that second speech data that has brought about the recognition text where a matching degree to the original text satisfies a certain condition is associated with the original text, the dataset including the second speech data and the original text, the second speech data being included in the first speech data; and if a difference between the recognition text generated from the first speech data and the original text is more than a threshold, generating third speech data assigned at least one of a pronunciation or an accent which is different from that assigned for generating the first speech data.

* * * * *